United States Patent [19]

Haas

[11] Patent Number: 4,836,880
[45] Date of Patent: Jun. 6, 1989

[54] TIRE ASSEMBLY MACHINE

[76] Inventor: Herbert G. Haas, 1650 Perry Dr., Canton, Ohio 44708

[21] Appl. No.: 164,427

[22] Filed: Mar. 4, 1988

[51] Int. Cl.$^4$ .................... B27D 30/24; B27D 30/32
[52] U.S. Cl. .................... 156/400; 156/401; 156/403
[58] Field of Search ............ 156/394.1, 398, 400, 156/401, 402, 403, 408, 414, 413

[56] References Cited

U.S. PATENT DOCUMENTS

| | | | |
|---|---|---|---|
| 3,438,832 | 4/1969 | Cantarutti | 156/401 |
| 3,713,950 | 1/1973 | Beal | 156/401 |
| 3,721,600 | 3/1973 | Cantarutti | 156/401 |
| 3,728,194 | 4/1973 | Enders | 156/401 |
| 3,740,293 | 6/1973 | Jones et al. | 156/401 |
| 3,765,986 | 10/1973 | Brey | 156/400 |
| 3,776,802 | 12/1973 | Mallory et al. | 156/401 |
| 3,784,437 | 1/1974 | Appleby et al. | 156/401 |
| 4,508,586 | 4/1985 | Brown et al. | 156/401 |
| 4,683,021 | 7/1987 | Stalter et al. | 156/401 |
| 4,705,589 | 11/1987 | Enders | 156/401 |

Primary Examiner—Willard Hoag
Attorney, Agent, or Firm—Reese Taylor

[57] ABSTRACT

A tire building machine having opposed support shafts for engagement with opposed ends of a tire building drum and opposed ply turn down and bead setting mechanisms movable axially along the support shafts toward and away from the drum. The machine includes parallel bearing rails extending substantially the length of the machine. The ply turn down and bead setting mechanisms are carried by opposed housings which are supported by bearings which ride on the bearing rails. The ply turn down and bead setting mechanisms also carry bearings which ride along the shafts during axial advancement thereof. Finally, the turn down mechanism is supported on the housing at multiple points about its periphery to insure correct alignment thereof.

7 Claims, 9 Drawing Sheets

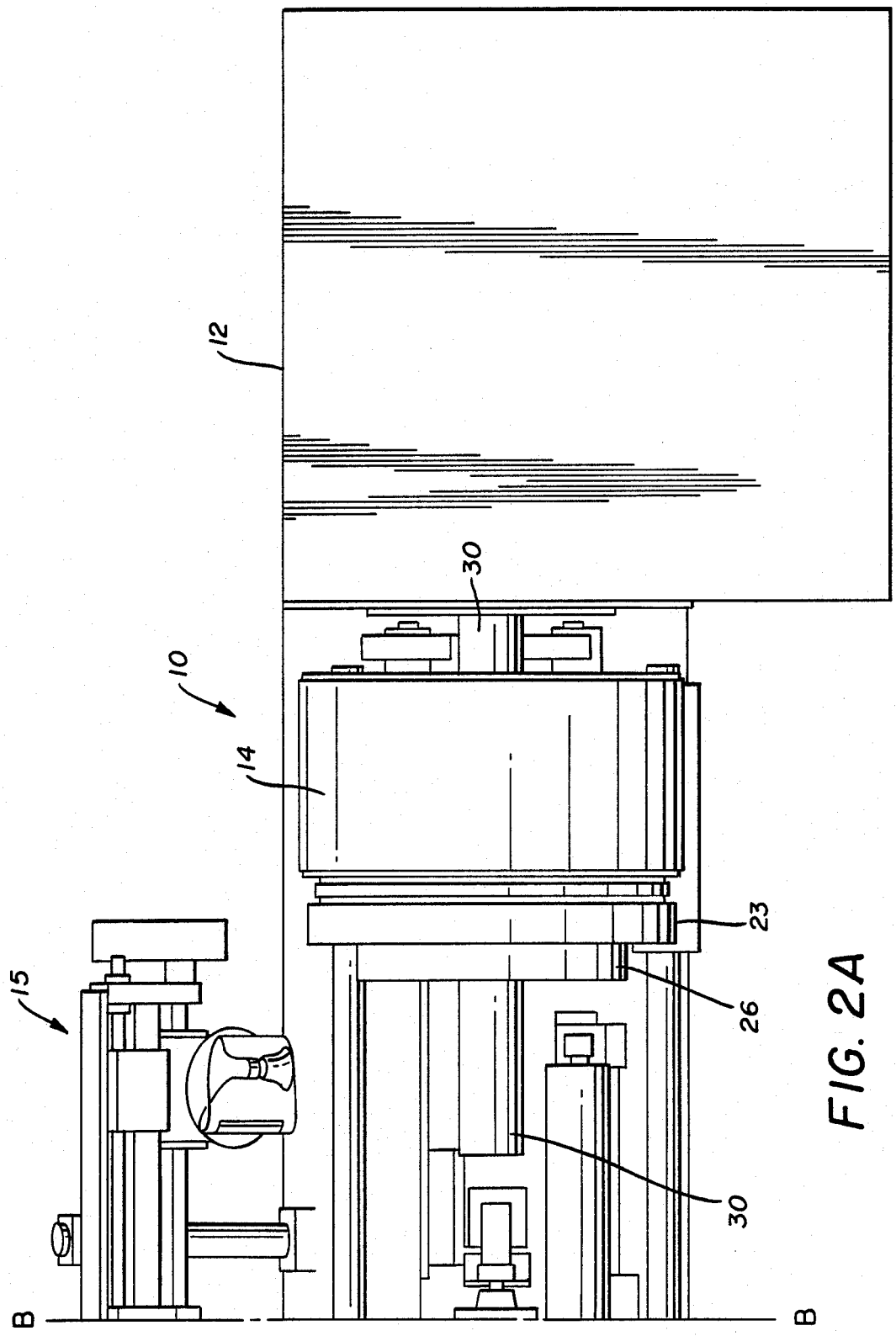

TIRE ASSEMBLY MACHINE

BACKGROUND OF THE INVENTION

This invention relates, in general, to tire building machines and relates, in particular, to improvements in the alignment and concentricity of the ply turn down fingers and bead setting rings on single and double stage tire building machines.

DESCRIPTION OF THE PRIOR ART

It is common in the manufacture of pneumatic tires to employ tire assembly machines on which one or more tire plies are applied in cylindrical form on an expandable-collapsible tire building drum. These plies, which are a combination of fabric and cords, are applied with their edges extending axially beyond the axial ends of the drum.

Inextensible tire beads are then positioned on the ply ends at the ends of the drum from both the tail stock and feedstock ends, and these ply ends are then turned up around the beads with the assistance of an inflatable ply turn-up bladder and stitched onto the exposed surface of the plies which have been positioned about the circumference of the drum to form the tire carcass.

These machines employ ply turn down fingers and bead setting rings which are carried by bead setting housings which are movable axially toward and away from the drum. The ply turn down fingers press or wipe the axially extending ply ends down to receive the beads and the ply turnup mechanism, which incorporates the inflatable bladder, when brought into position at the end of the drum and inflated, causes, in cooperation with a pusher ring, the previously turned down ply ends to be turned up about the previously set beads and into position on the carcass.

Specifically, the plies which extend over the ends of the drum are turned down or wiped over the ends of the drum by the flexible ply turn down fingers which are advanced axially toward the drum and are urged into contact with the ends of the plies by a ring which advances along them to force them downwardly thereby positioning the ends of the plies to form a surface for receipt of the beads. The beads are then set in place by bead setting rings which also move axially toward the drum and which carry the beads up to and into engagement with the turned down ply ends. The ply turn-up bladders are then inflated and a bladder turn down ring is advanced axially into engagement with each bladder to force it over the end of the drum so that the ply ends are folded up around the beads and onto the plies of the tire carcass.

The tire can then have the tread and belts, if appropriate, applied and be removed from the drum, which is radially collapsible, for further processing and curing. Such a general arrangement is well-known in the tire building industry and can be seen in such patents as Cantarutti U.S. Pat. Nos. 3,438,832 and 3,721,600; Appleby U.S. Pat. No. 3,784,437; and Enders U.S. Pat. No. 4,705,589.

It is important, however, in this type of operation to insure that the ends of the ply turn down fingers engage the ply ends at the same time or, in other words, are concentrically aligned with the axis of the drum as they are advanced. When this does not happen, the fingers engage portions of the ply ends at different times and a different tension is imparted to the cords in some of the plies thereby affecting the structural integrity of the tire.

It is also important that the non-extendable beads be advanced toward the drum and set in place with precise concentric alignment with the drum axis as well.

The difficulty is that in most single or double stage building machines of this general type, the main shafts which carry the turn down finger rings and the bead setting rings project toward the drum from points of support at their ends remote from the drum and are subject to deflection from the horizontal so that, as the turn down and bead setting apparatus moves away from the remote points of support, the fingers and the rings often approach the drum out of concentricity therewith.

SUMMARY OF THE INVENTION

It has been found, therefore, that if the framework of the tire building machine can be modified to provide additional support and bearing surfaces along which the turn down and bead setting assemblies move, the main shafts of the machine will be held parallel and coaxial with the axis of the drum. This insures that, for example, as the turn down fingers approach the drum, they are maintained in a suitable condition so as to contact the ply ends simultaneously about the circumference of the end of the drum and also that the bead setting rings are maintained in a suitable concentric position during their approach to the drum so that the beads are properly positioned.

It has thus been found that a pair of parallel linear bushing supports can be provided on the machine base extending the length of the machine in supporting relationship with the movable ply turn down and bead setting housings, so that sag or deflection of the shafts can be compensated for as the weight of the housings is moved axially outward from the point of support of the shafts. That is, these supports will urge the housings and the turn down and bead setting apparatus carried thereby into a true horizontal path of movement.

It has further been found that the sag compensating effectiveness of the supports just referred to can be further enhanced by providing a rotary bearing or sliding bushing on the shafts in supporting relationship with the bead setting ring which will further compensate for sag or deflection of the shaft as the housings move axially outwardly from their points of support.

Thus, the cooperation between the linear supports on which the housings travel and the bearing support between the rings and the shafts will insure concentricity of the apparatus carried by the housings.

It has also been found that, by providing a three point mounting on the housing for the ring which supports the turn down fingers, concentricity can be further assured and it can be insured that the fingers will contact the ends of the plies at the same time about the circumference of the drum. Thus, by supporting these rings at twelve, three and nine o'clock positions, any tendency of the fingers which project therefrom to be presented to the ply ends out of concentricity can be avoided.

Accordingly, production of an improved tire assembly machine of the character above-described, becomes the principal object of this invention with other objects thereof becoming more apparent upon a reading of the following brief specification considered and interpreted in view of the accompanying drawings.

BRIEF DESCRIPTION OF THE DRAWINGS

FIGS. 2 and 2A are a top plan view of the improved tire assembly machine with match lines B—B being employed and with the tire building drum removed.

BRIEF DESCRIPTION OF THE PREFERRED EMBODIMENTS

Figure 1:
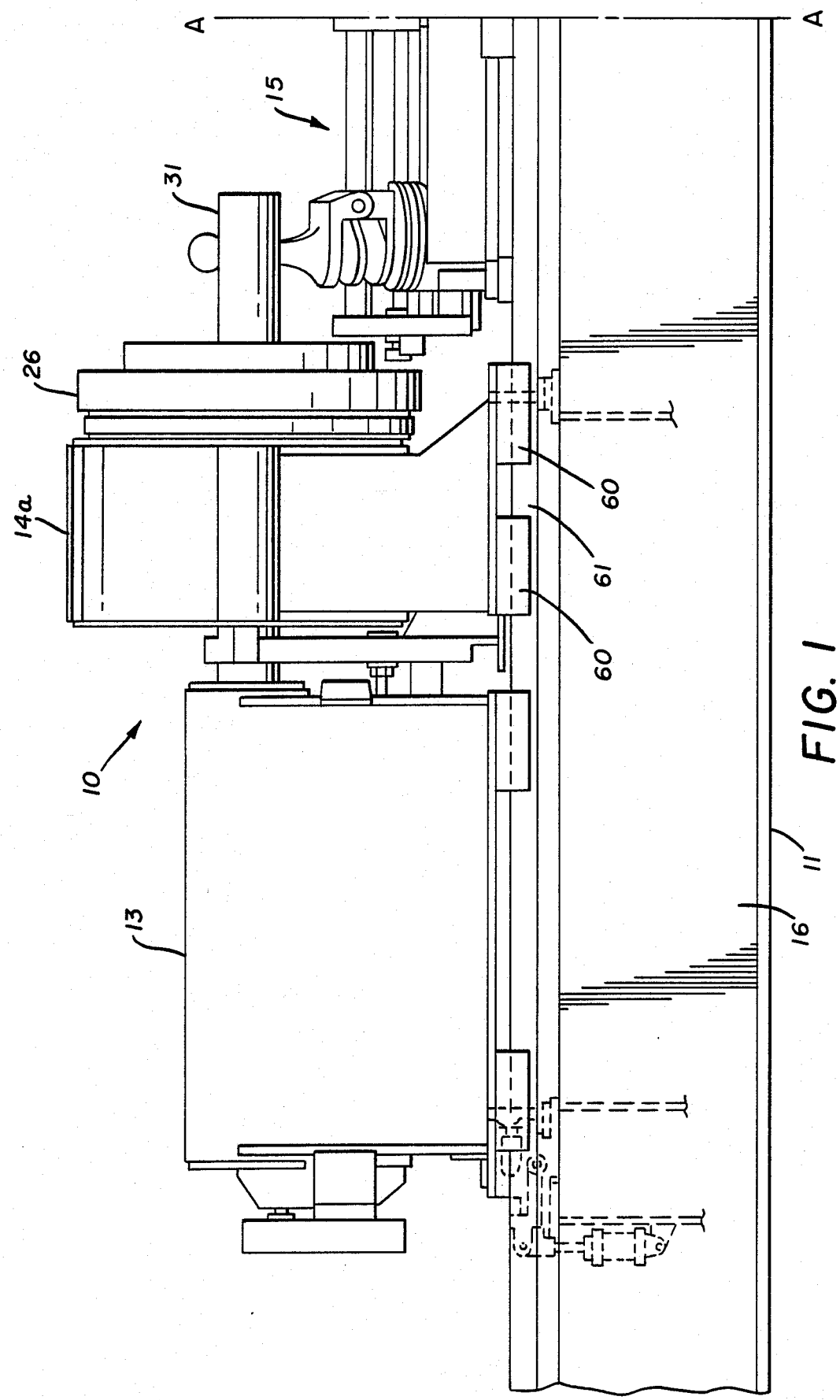
FIGS. 1 and 1A are an elevational view of the improved tire assembly machine with match lines A—A being employed and with the tire building drum removed.
Figure 1A:
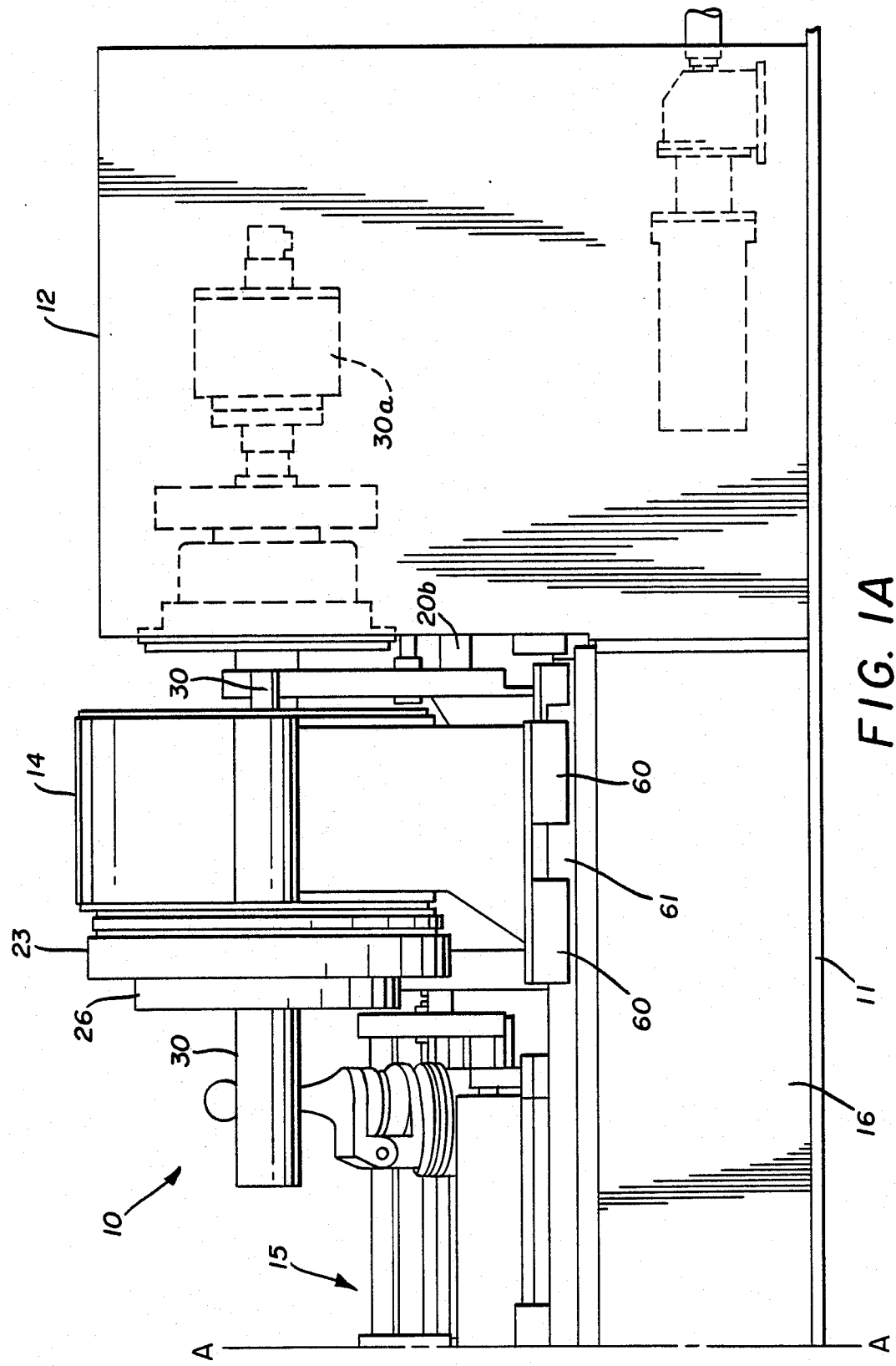
Figure 2:
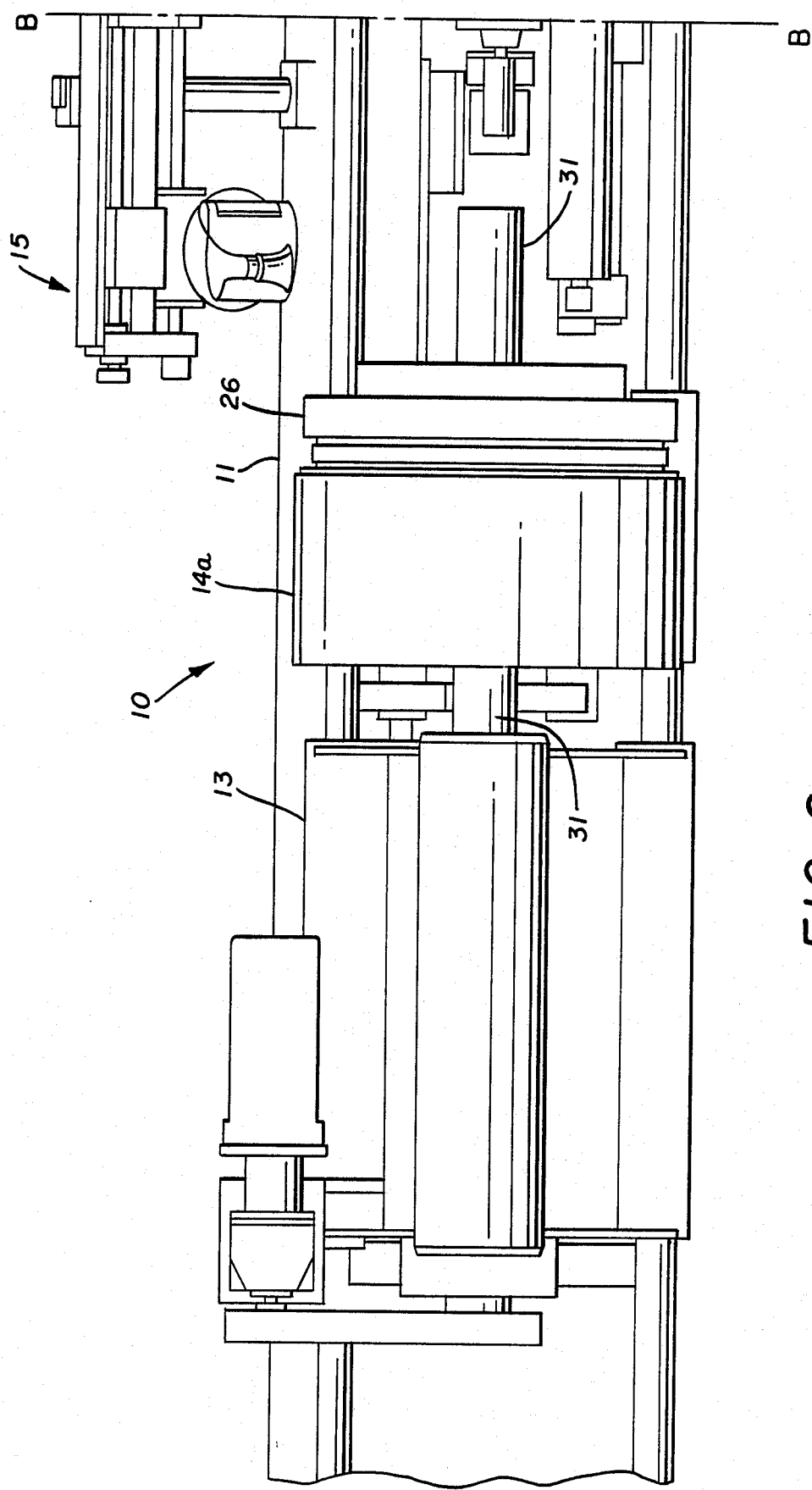

It will be understood at the outset that the tire assembly machine of the present invention is of the type which employs a rotating drum about the circumference of which one or more plies P are built up with their ends PE extending axially beyond the ends of the drum to form a tire carcass. Furthermore, operation of such a tire assembly machine involves the utilization of ply turn down fingers which advance axially toward the drum and engage the opposed, extended ends of the plies to turn them down in preparation for seating of the bead.

It will further be understood that the invention relates to the general type of tire assembly machine wherein the beads are set by bead setting rings which advance axially toward the drum and deposit the beads on the turned down ends of the plies.

Finally, it will be understood that the general type of tire assembly machine described herein involves the utilization of inflatable bladders which are positioned adjacent the tire building drum and which, when inflated, will engage the underside of the turned down ends PE of the plies P and force them up and over the ends of the drum in conjunction with axially advancing bladder turn down rings so that the ply ends are folded over the beads and secured to the exposed surface of the plies.

While apparatus such as the bead setting ring, ply turn down fingers, etc., are advanced toward the drum from both the tail stock and housing ends, for simplicity, only the structure on the housing end of the machine will be described and illustrated in detail herein. The problems of shaft deflection and finger concentricity are the same in each case and the inventive solutions thereto which are the subject of this patent application are also the same so that a detailed description of one arrangement will adequately define the invention to those skilled in the art.

With that in mind, reference will be first had to FIGS. 1, 1A, 2 and 2A of the drawings wherein it will be seen that the tire building machine is generally indicated by the numeral 10 and rests on a support base plate 11. A suitable tire building drum 40 (See FIG. 3) is mounted on the drum drive shaft 30 at the housing end and the drum shaft 31 at the tail stock end which are conventionally supported so as to project toward each other. Further, it will be noted that the shaft 30 is rotatably driven by motor 30a. It will also be noted that the shafts 30 and 31 are essentially supported at the ends thereof remote from the drum 40 such that shaft 30 is supported at the machine housing 12 and shaft 31 is supported at the tail stock slide 13. The drum 40 may be of any conventional type and the structure for mounting the drum on shafts 30 and 31 is also conventional.

The machine 10 also includes bead setting housings 14 and 14a, a ply turn down stitcher assembly 15, a lower stitching assembly 50, a ply roller 70 and a foot control 90, all of which are also of conventional construction.

As previously mentioned, it will be understood that the housings 14 and 14a will, during construction of the tire, move along the axes of the shafts 30 and 31 toward and away from the drum 40. Since those shafts are supported at their respective ends, remote from the drum, this movement of the housings 14 and 14a presents added weight to the projecting ends of shafts 30 and 31, which, when added to the weight of drum 40, often causes deflection of the shafts out of a horizontal plane.

This, then, adversely affects the concentricity and alignment of the apparatus carried by the housings 14 and 14a with respect to drum 40 with it being preferable that a line through the longitudinal center lines of shafts 30 and 31 and drum 80 be in a horizontal plane at all times.

In order to understand the inventive improvement of this application, some detailed explanation of the apparatus of these housings is necessary.

As noted above, only the apparatus carried by housing 14 at the housing end of the machine will be described in detail.

Figure 3:
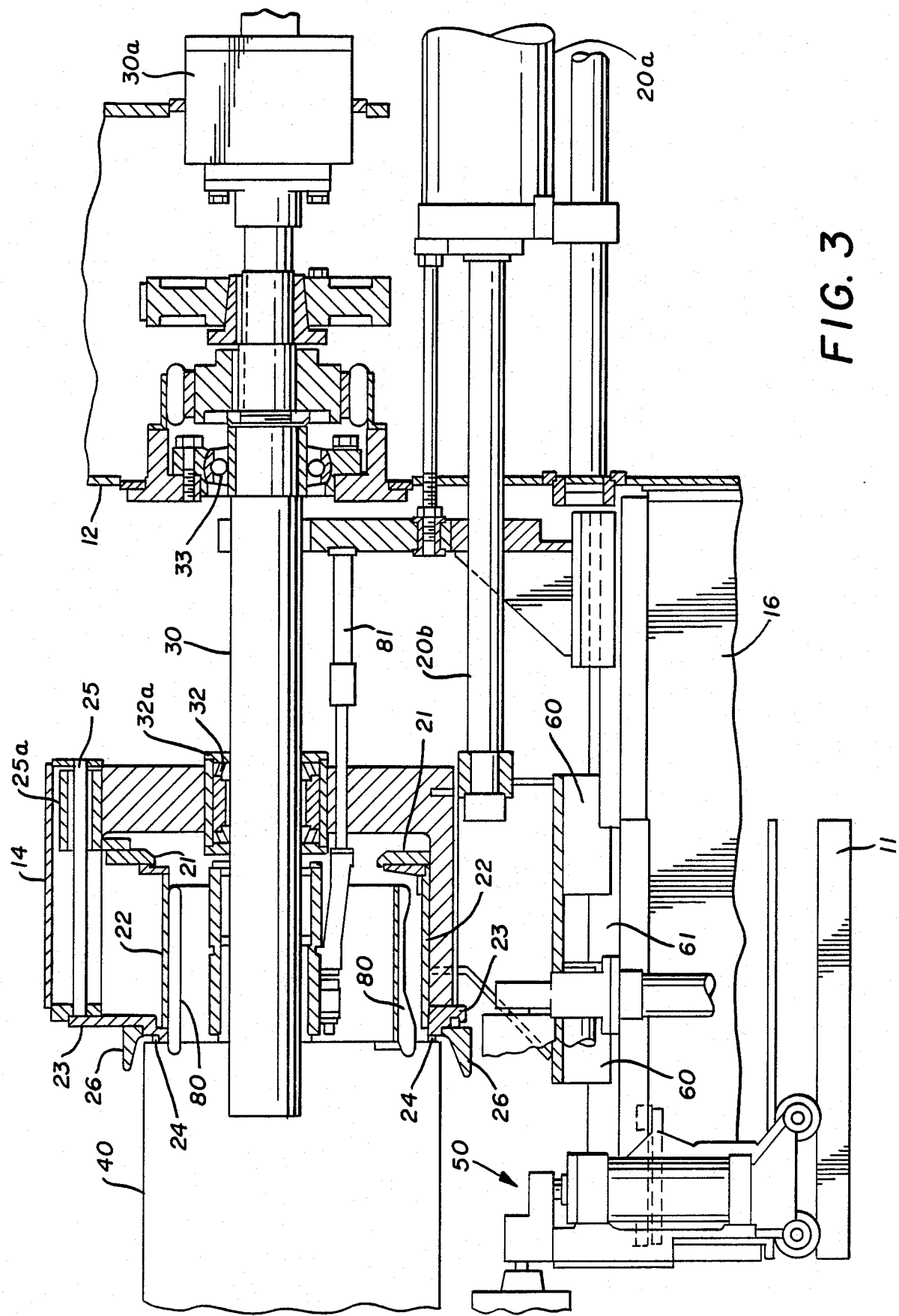
FIG. 3 is a detailed elevational view showing the building drum and the assembly equipment advanced to the ply turn down position.
Figure 4:
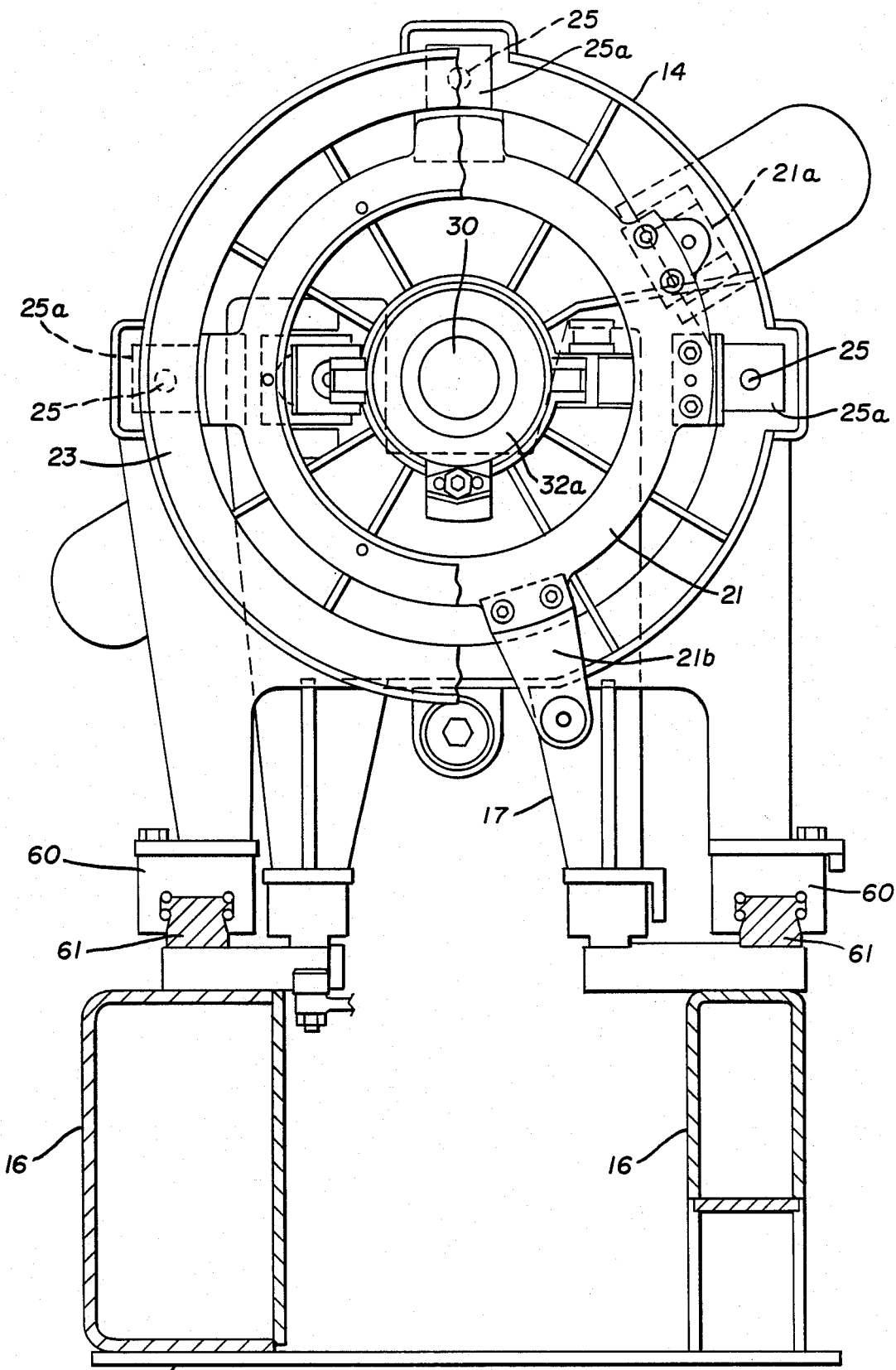
FIG. 4 is a sectional view taken along the line 4—4 of FIG. 3.
Figure 5:
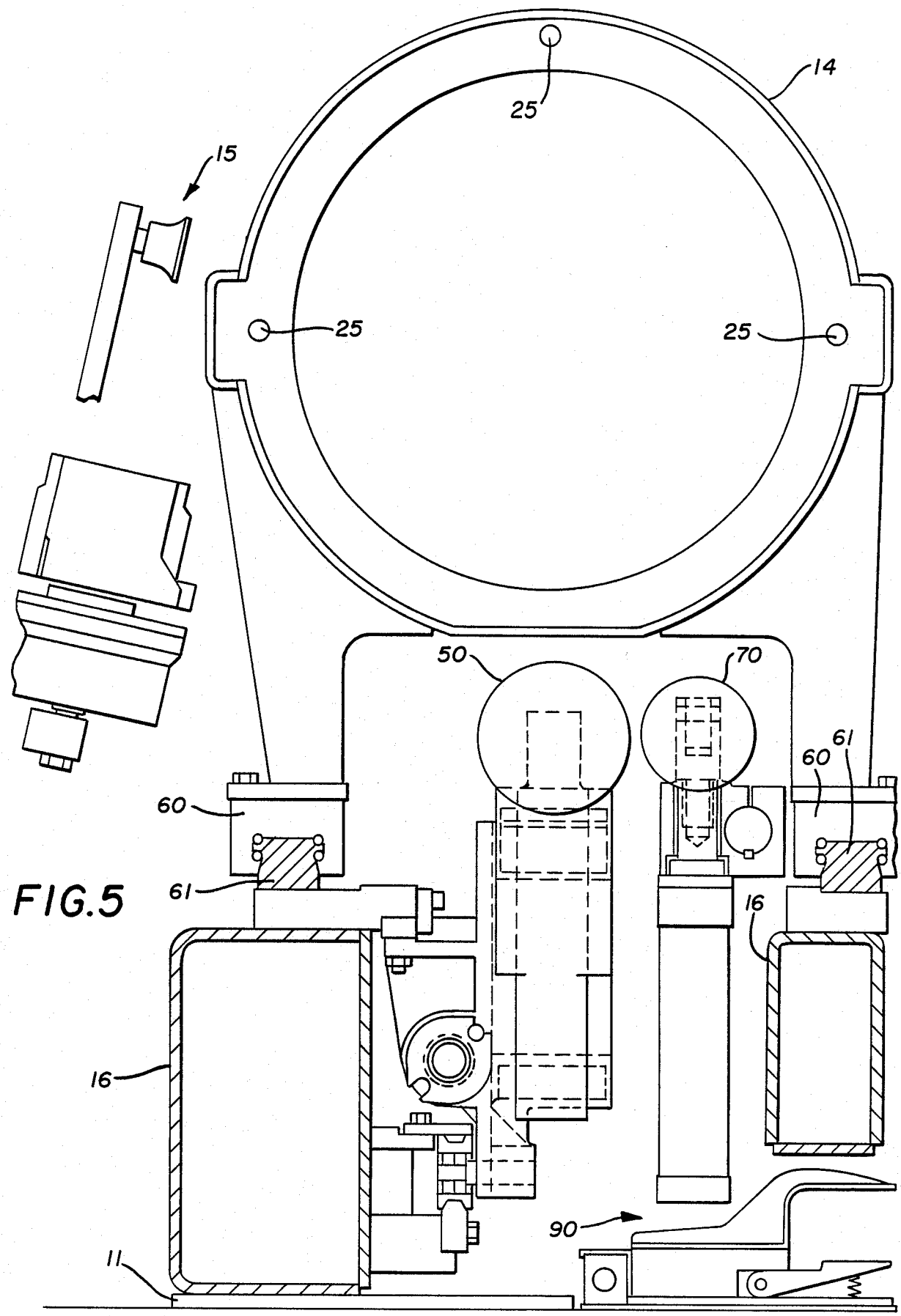
FIG. 5 is a sectional view taken along the line 5—5 of FIG. 3.

Referring then to FIGS. 3 and 4, the bead setting assembly 20 has a bead set cylinder 20a and a finger mounting ring 21 which is secured to an air cylinder 21a (See FIG. 4). The bead set cylinder 20a has its cylinder rod 20b projecting from machine housing 12 and attached to housing 14 so as to move the housing axially toward and away from drum 40, as will be described.

The finger mounting ring 21 provides a mounting for one end of each of a plurality of flexible spring fingers 22 which are disposed about the circumference of the ring and which project axially toward the drum 40. The shaft 25 on which ring 21 moves is conventionally supported at the top of housing 14 by a bearing 25a. In the improvement of the invention, additional bearings 25a, 25a and shafts 25,25 are also employed at approximately 90° intervals about housing 14 so as to assure true movement of ring 21. This arrangement can be clearly seen in FIG. 4 where the shafts 25 are disposed at twelve, three and nine o'clock positions.

A bead mounting ring 23 is also provided on housing 14 for carrying the bead 24 to the drum 40 and a bladder turn down ring 26 is also provided on the housing and is also movable axially toward and away from the drum.

It will also be noted that the machine base 11 has upwardly projecting support walls 16,16 and that parallel bearing rails 61 are provided on the tops of these walls and extend from the tail stock end of the machine up to the housing 12 end and provide support for housings 14 and 14a. As will also be seen in FIG. 4, the support walls 16,16 provide a parallel support for the bearing rails 61,61 which are secured thereto. These rails 61,61 provide a track for linear bearings 60,60 which are carried by and support the housings 14 and 14a and serve to counteract any tendency of shaft 30 to deflect out of a horizontal plane as the rings 21 and 23 are advanced toward the drum, as will be explained further below.

Still referring to FIGS. 1, 1A, 2 and 2A of the drawings, it will be noted that a drum drive motor 30a is also provided on machine housing 12 and the main drum drive shaft 30 extends therefrom. Received about this shaft 30 are tapered roller bearings 32 which are received in axially movable bearing housing 32a and by bearing 33 on housing 12. It will be apparent that the shaft 30 projects outwardly from its mounting point at bearing 33 and that, as the bead set assembly and pusher ring advance toward the drum 40, considerable weight will be transferred along the shaft 30, thus raising the possibility of deflection of the projecting end. The improved support provided by rails 61,61 and bearing 32 will, as previously noted, conteract this tendency.

To complete the general description of the machine, as previously mentioned, a lower stitching assembly 50 is also provided adjacent the tail stock end of the machine, as is a ply roller 70, suitable for conventional use, and as is a foot control 90 and the turn-up bladder 80 which has already been referred to. In that regard, the specific operation and arrangement will not be described herein except to note that turn-up bladder 80 can be advanced to the FIG. 3 position in conventional fashion.

Figure 3A:
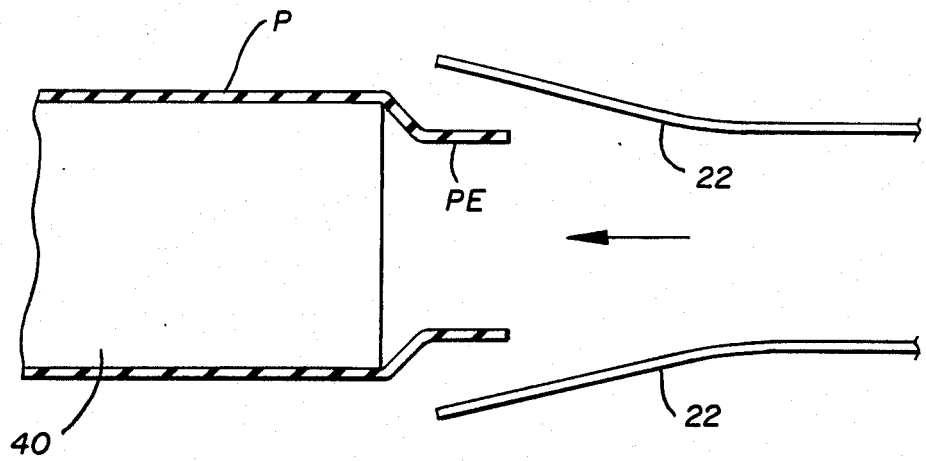
FIGS. 3A through 3E are partially schematic views showing the position of selected components of the machine at various stages of operation.

In use or operation of the improved tire assembly machine 10, it will first be assumed that the drum 40 has been mounted on shafts 30 and 31 and that tire carcass has been built up on the tire building drum 40 with the assistance of the ply roller 70 so as to comprise a tire body of one or more plies P, the ends PE of which extend axially over the opposed ends of the drum 40 and that the bladder 80 has been moved in under the drum in conventional fashion. FIG. 3A illustrates this condition at the feed end of the drum. The tire is then ready for application of the beads and turn-up of the ply ends PE.

Accordingly, the ring 21 and flexible ply down fingers 22 are advanced toward the tire building drum 40 by the air cylinder 21a, moving independently of housing 14. These flexible fingers 22 have a tendency to open outwardly or "flower" out when they are unrestrained. They will thus have a flared effect at their projecting ends as they approach the drum 40, as can be seen in FIG. 3A.

Figure 3B:
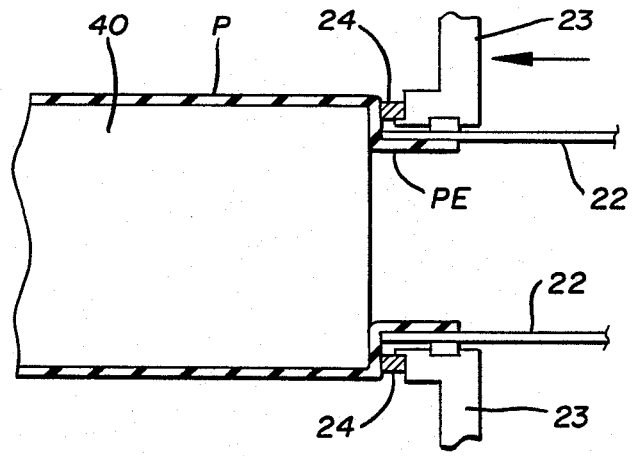

However, after a certain amount of independent movement of ring 21, further movement is prevented by engagement of stop 21b with housing frame member 17 (See FIG. 4). At that time, the housing 14, carrying the entire bead setting assembly, will move toward the drum upon actuation of cylinder 20a. Thus, a predetermined distance from the end of the drum 40, the advancement of the fingers 22,22 will cease. The bead setter ring 23 which is carried on housing 14 and which carries the bead 24, however, continues to advance and, as it advances along the longitudinal axis of the turn down fingers 22,22, the fingers will be deflected downwardly or wiped over the end of the drum, as shown in FIG. 3B. As they are deflected downwardly, they will force the projecting ends PE of the plies P down over the end of the drum 40. The three point mounting of ring 21 on the housing 14 will insure that the fingers are concentric with bead setter ring 23 at this time.

Of course, as the bead setter ring 23 continues its advance, the bead 24 will be set against the sticky outer surface of the turned down ends PE of the plies P ready for the turn-up operation.

Figure 3C:
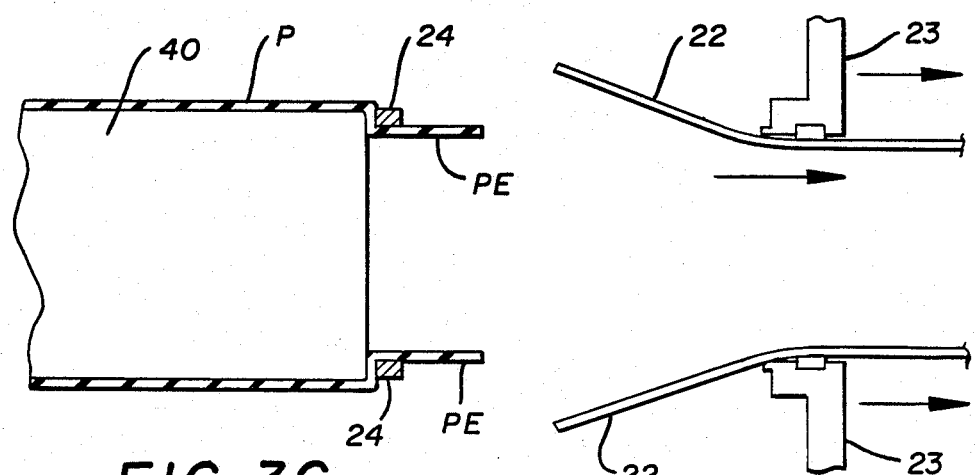

At this point, the bead setter ring 23 is retracted axially away from the end of the drum 40 and, of course, the ring 21 and fingers 22,22 are also withdrawn. FIG. 3C illustrates the position of the components at that point wherein the ends PE of the plies P have been turned down and the bead 24 is in place.

Figure 3D:
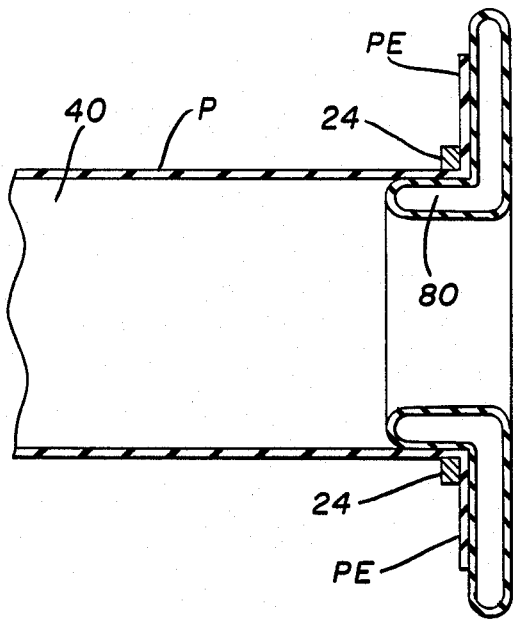
Figure 3E:
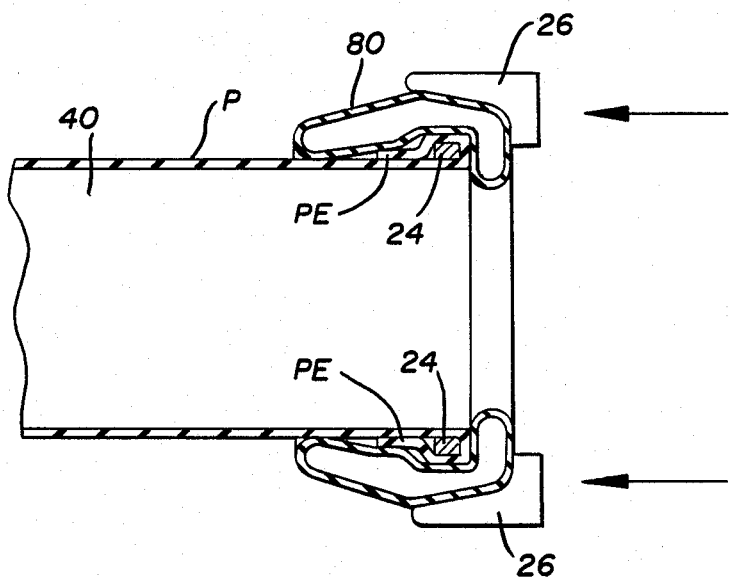

At that time, the bladder 80 is inflated through air inlet 81, roughly taking the position illustrated in FIG. 3D of the drawings wherein it will be noted that the ends PE of the plies P will have been forced upwardly. Return advancement of housing 14 toward the drum brings the pusher ring 26 toward the drum 40 and into engagement with the bladder 80 and forces the bladder to fold over and, thus, to fold the ply ends PE over and set the beads 24, as clearly shown in FIG. 3E of the drawings. This causes ply ends PE to be secured to plies P of the tire carcass, as can be seen from FIG. 3E.

It should be noted here that the ball bushings 25,25, located at 90° intervals in support of ring 21 as shown in FIG. 4, insure proper operation of the fingers.

Thus, they insure that the fingers 22,22 engage the ends PE of the plies P at the same time all around the circumference of the drum 40. When the fingers 22 on the top quadrant of the drum, for example, engage the ply ends PE prior to engagement on the bottom, a different tension is imparted to the cords contained in certain areas of the plies, thereby affecting the structural integrity of the ultimately built tire.

Additionally, the bead setting surface on the ring 23 is desirably parallel to the plane of the end of the drum 40. Again, if the main shaft 30 is permitted to deflect, this is not the case and the bead 24 is not accurately set in place. This problem is avoided with the present invention.

It will, accordingly, be seen then that employment of the linear bearings 61,61 on the housing, in cooperation with the support of bearing 32 which moves along shaft 30 as housing 14 advances and the parallel supporting rails 61,61 lift the shaft to the proper horizontal mode and provide for improved uniformity in the turn down of the ply ends and the setting of the beads.

As previously mentioned, a similar arrangement exists at the tail stock end of machine 10 so that any tendency of the shafts 30 and 31 to deflect out of a horizontal plane is effectively counteracted.

While a full and complete description of the invention has been set forth in accordance with the dictates of the Patent Statutes, it should be understood that modifications can be resorted to without departing from the spirit hereof or the scope of the appended claims.

Therefore, while a specific type of tire building machine has been referred to and illustrated, the invention is not intended to be limited solely to employment with such a machine.

Furthermore, while the support for ring 21 has been illustrated as being arranged at three points spaced 90° about half the circumference of the ring, reasonable variations may be resorted to.

What is claimed is:

1. In a tire building machine having opposed support shafts for engagement with opposed ends of a tire building drum and opposed ply turn down and bead setting mechanisms movable axially along the support shafts toward and away from the drum so as to advance beads carried thereby into proximity with the ends of the drum, the improvement comprising:

(a) opposed housings, movable along the support shafts;
(b) said ply turn down and bead setting mechanisms being carried by said housings;
(c) first bearing means disposed beneath said housing; and
(d) second bearing means movable along the support shafts as the ply turn down and bead setting mechanisms move therealong with said first bearing means remaining substantially beneath said second bearing means as said mechanisms move along the shafts.

2. The machine of claim 1 wherein said first bearing means include parallel rails extending substantially the length of the machine and bearings carried by said housings and movable along said rails.

3. The machine of claim 1 wherein said second bearing means include bearings carried by and movable with the ply turn down and bead setting mechanisms in encircling relationship with the shafts.

4. The machine of claim 2 wherein the ply turn down mechanism includes support rings carried by the housings for movement relatively thereof; said support rings being mounted on the housings at at least two points spaced about the circumference thereof.

5. The machine of claim 4 wherein said support rings are supported on the housings at points spaced at approximately 90° intervals about the circumference thereof.

6. The machine of claim 5 wherein said support rings are supported by a plurality of elongate shafts secured to and projecting from said housings.

7. In a tire building machine having opposed support shafts for engagement with opposed ends of a tire building drum and opposed ply turn down and bead setting mechanisms movable axially along the support shafts toward and away from the drum, the improvement comprising:
(a) first bearing means disposed beneath the ply turn up and bead setting mechanisms;
(b) second bearing means movable along the support shafts as the ply turn down and bead setting mechanisms move therealong with said first bearing means remaining substantially beneath said second bearing as said ply turn down and bead setting mechanisms move along the shafts; and
(c) pusher rings movable with said mechanisms and mounted for concentric positioning with respect to the ends of the drum.

* * * * *